Patented Oct. 20, 1953

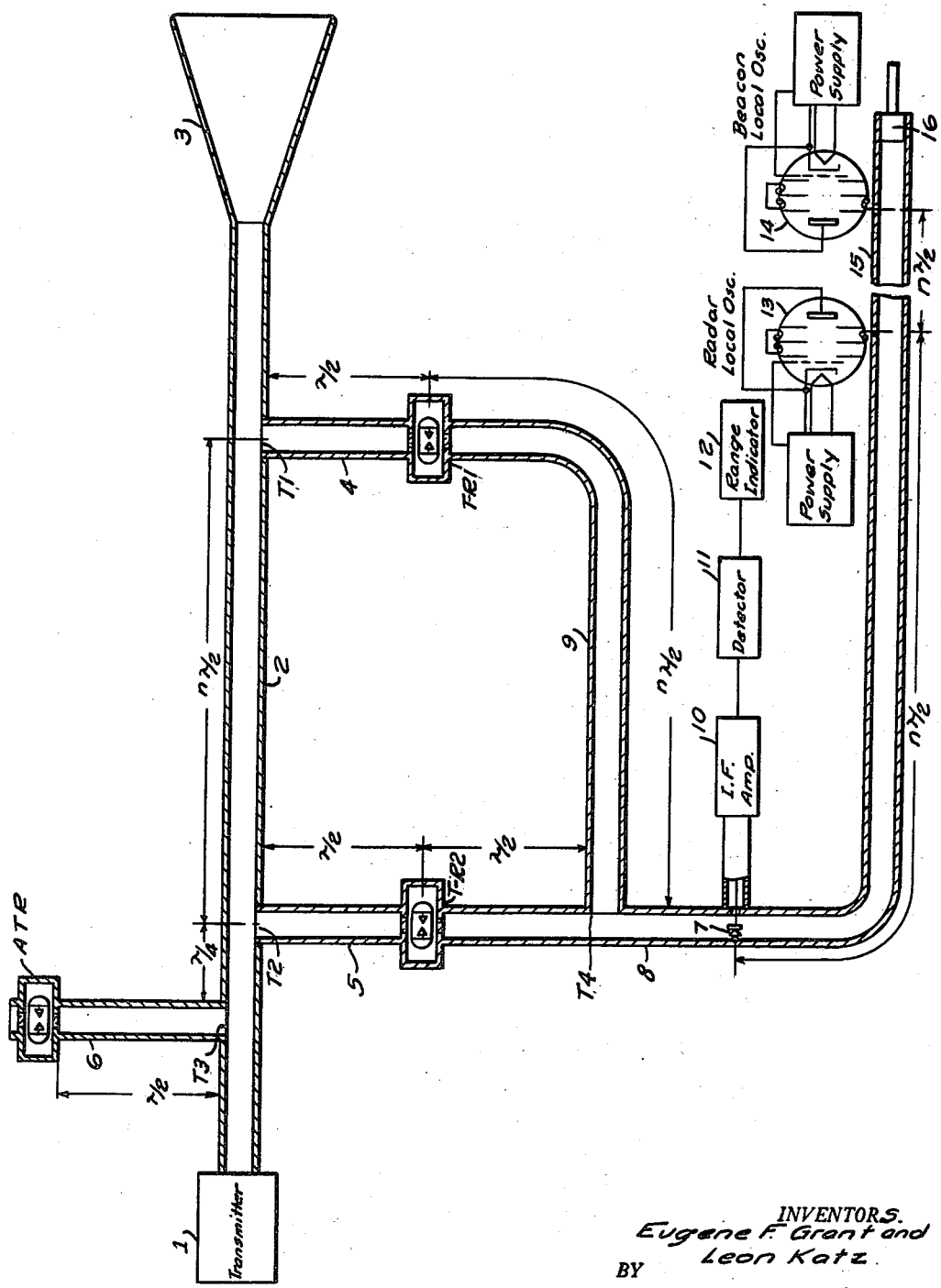

2,656,530

UNITED STATES PATENT OFFICE 2,656,530

BEACON RADAR SYSTEM

Eugene F. Grant, Arlington, Mass., and Leon Katz, Sutherland, Saskatchewan, Canada, assignors to Westinghouse Electric Corporation, East Pittsburgh, Pa., a corporation of Pennsylvania Application June 11, 1948, Serial No. 32,354

8 Claims. (Cl. 343—6)

This invention relates generally to radar beacon systems and more particularly to combined radar and beacon systems having provision for operation from a single antenna and with a single receiver-indicator.

In the usual single antenna radar equipment, a transmitter develops high power electro-magnetic signals, at ultra-high frequency, in the form of discrete pulses. These pulses are applied to an antenna over a suitable transmission medium such as a hollow wave guide or a co-axial or parallel wire transmission line. The antenna directs the signals in known directions. Upon interception of a target by the signals, the transmitted energy is scattered or reflected, and returns to the transmitting antenna, for interception thereby, the antenna then performing a receiving function.

The received energy is at extremely low level normally and is applied to a sensitive receiver-indicator for detection, amplification and display. The receiver-indicator system is coupled to the antenna by coupling to the transmission medium existing between the transmitter and the antenna, and the receiver is normally of the super-heterodyne type, comprising a local oscillator, a crystal mixer for receiving and mixing the reflected signals with the output of the local oscillator, and an intermediate frequency amplifier, detector and video amplifier for amplifying and detecting the output of the mixer.

A radar beacon responder is a device which, upon reception of a pulse of electro-magnetic energy from a radar transmitter, triggers its own transmitter to provide a strong reply of one or more pulses, independent of radar targets or of radar echoes otherwise originating in its vicinity. A device used to trigger a beacon responder may be called an interrogator, the process of triggering the beacon being called "interrogation." The reply of the beacon responder may be coded in various ways, for identification purposes, and the operator of a radar equipment may, by utilizing his transmitter as an interrogator, determine the location of remote objects, which identify themselves by virtue of the coded responses available. The beacon responders may be located at known positions, whereby to provide homing information, or the beacon responders may be located on movable craft and identify these as friend or foe, or in other respects, by the virtue of the coding of the signals deriving from the beacon responders.

It is the usual practice that all the beacon responders in an area operate on the same frequency, and that this frequency is outside the radar band. At the same time it is desirable that the radar receiver-indicator be utilized for beacon signal reception and display, to maintain minimum weight and space requirements for radio-equipment, especially aboard aircraft. Accordingly, unless the R. F. system of the radar receiver is very broad the beacon signals will suffer considerable attenuation as compared with radar signals.

Since the high power signals introduced into the transmission medium between the transmitter and the receiver are highly detrimental to the receiver if applied thereto, overloading the receiver and/or burning out the crystal mixer thereof, a transmit-receive switch is usually interposed between the transmission medium and the receiver. The purpose of the transmit-receive switch is to prevent high power transmitted pulses from passing to the receiver, while enabling the passage of low intensity received signals to the receiver. The usual transmit-receive switch comprises a resonator in the form of a tuned section of transmission lines or a resonant cavity, having a low pressure gap therein. The line or the cavity is tuned to the frequency of the radar signals. When low power is transmitted along the transmission line the resonator acts effectively as an open circuit across the receiver terminals, interposing no impedance to the passage of energy to the receiver. When high power is applied to the resonator, on the other hand, the gap breaks down, the resonator then presenting a low impedance across the receiver input terminals, short circuiting the latter, and preventing transmission to the receiver of the transmitted energy.

The transmit-receive switch, being a high selectivity tuned structure, and being tuned to the radar frequency, rather than to the beacon frequency, in the normal radar system, additionally attenuates the beacon signals. Accordingly, reception efficiency of the radar system to beacon signals is greatly reduced.

It is a primary object of the present invention to provide an improved radar beacon system.

It is a more specific object of the invention to provide a receiving system for radar echoes on one frequency and beacon signals on another frequency which is capable of operating with high receiving efficiency with respect to both frequencies.

It is a further object of the invention to provide a radar beacon receiving system having separate tuned radio frequency channels for radar signals and for beacon signals.

It is another object of the invention to provide a combined radar and beacon signal receiving system in conjunction with a radar transmitter wherein a transmit-receive switch is provided for a radar echo signal transmission channel and a further transmit-receive switch is provided for a beacon signal transmission channel, each of the transmit-receive switches being tuned to provide effective operation with respect to its associated transmission channel, without detriment to the overall operation of the system.

In accordance with the invention, we provide a transmission medium between a transmitter and an antenna, which may comprise a hollow guide or a transmission line of any known type. An anti-T-R or transmit-receive switch is coupled with the medium, in known fashion, and operates to minimize the portion of received signals which might be absorbed by the transmitter, in the absence of the anti-T-R switch. A pair of T junctions are provided in the transmission medium, at spaced points therealong, one performing as a beacon signal channel and the other as a radar echo channel. A T-R switch is coupled in each of the channels, and the switches are very sharply tuned, one to the radar frequency and the other to the beacon frequency. The T-R switches are located one half wave length from the transmission medium, and short the T junctions in response to transmission of each pulse, so that signals are propagated to the antenna without attenuation.

Upon return of a reflected or echo signal, the beacon channel T-R switch, being untuned to the echo signal frequency, presents a short across the associated T junction, and the echo signal is diverted from the beacon channel. The anti-T-R switch may be broadly tuned, and prevents transmission of the echo signal to the transmitter. The echo signal channel contains a T-R switch tuned to the echo signal frequency, and passes the echo signal.

The beacon channel likewise passes the beacon signals and refuses the radar echo signals. The two channels are connected in parallel at the crystal mixer of the system, the coupling being over extensions of the channels which are of suitable length, i. e. multiples of one half wave length, between the T-R switches and the crystal junction, to assure that the radar signals will encounter at the crystal mixer, a short circuit across the beacon signal coupling extension and that the beacon signals will likewise encounter a short circuit across the radar echo coupling extension. At the same time the distances from the transmitter to the crystal mixer via the beacon signal channel and via the radar echo channel are caused to differ by an odd multiple of half wave lengths so as to provide interference and substantial cancellation of the flat portions of transmitted pulse signals which leak through the T-R switches, upon arrival of the pulse energy at the crystal mixer via the two channels available to the energy.

It is, then, still a further object of our invention to provide a radar beacon system having means auxiliary to the normal transmit-receive switches for reducing the amplitude of transmitted pulses at the receiver of the system, and especially by providing complementary paths for transmitted energy to the receiver, the paths differing in length substantially by an odd multiple of one half wave length of the transmitter frequency.

It is an ancillary object of our invention to provide a transmission system including R.-F. switches in the use of which spurious energy, which leaks through the respective switches, shall be mutually counteracted.

The features of our invention which we consider novel are set forth with more particularity in the appended claims. The invention itself, however, may be best understood from the following description of a specific embodiment thereof, especially when taken in conjunction with the accompanying drawing, wherein the single figure illustrates schematically a circuit diagram of the invention.

Turning now to the drawing, the reference numeral 1 denotes a U. H. F. transmitter of short radar pulses, and which in the usual arrangement may comprise a magnetron oscillator, as the source of ultra high frequency signal. During transmission the output energy of the transmitter 1 travels down the main wave guide 2 to the antenna 3, from which the energy is radiated toward remote targets.

Two T junctions, T1 and T2, are provided for diverting energy from the wave guide 2 into associated receiver channels comprising wave guide sections 4 and 5. At distances of $\frac{1}{2}\lambda$ from the T sections, T1 and T2, are located low pressure gaps, T-R1 and T-R2, which act as transmit-receive or T-R switches. Upon passage of high power high frequency energy down the wave guide 2 the gaps T-R1 and T-R2 fire, presenting effectively a short circuit across the T junctions T1 and T2 and preventing passage of energy to the wave guide channels 4 and 5, without however, impeding passage of the energy down the main wave guide 2.

A further T junction T3 is made in the wave guide 2 at a distance $\frac{1}{4}\lambda$ in advance of the junction T2, having regard for the direction of travel of energy during transmission, for coupling to a wave guide section 6 of length $\frac{1}{2}\lambda$, across the far end of which is connected a further low pressure gap, ATR, which functions as an anti-transmit-receive or anti-T-R switch. Upon passage of transmitted energy down the wave guide 2 the anti-T-R switch ATR fires or breaks down, presenting a short circuit at the junction T3. Accordingly, the wave guide section 6 diverts no energy during transmission.

T-R structures may take various forms, but in their elements are basically spark-gap devices, usualy associated with resonant structures, and which serve to produce substantially a short circuit when submitted to excessively strong signals and which utilize this short circuit to exclude strong main pulse signals from the input circuit of a receiver, but which present no impedance to the passage of weak pulses to the receiver except such as is introduced by virtue of the selectivity of the associated resonant structure.

An anti-T-R structure is basically similar to a T-R structure but its interconnection is such as to prevent passage of weak reflected pulses to the transmitter of a radar equipment employing a common antenna for transmission and reception.

Both T-R and anti-T-R structures are well known in the prior art, and require no detailed illustration or further exposition in the present specification.

It will now be recalled that reception of signals is desired in two different, though normally substantially adjacent, portions of the ultra-high frequency spectrum, one of the frequencies, corresponding with a wave length $\lambda_1$, being the radar transmission frequency and corresponding with the frequency of reflected signals, and the other, corresponding with a wave length λ2, being the beacon frequency.

The present system must be adapted, in order to accomplish its objective, to receive either frequency, or both simultaneously, with equal efficiency. In the accomplishment of this objective the T-R switch TR1 is sharply tuned to the beacon frequency and the T-R switch TR2 is sharply tuned to the radar frequency. The anti-T-R switch ATR is broadly tuned, to be responsive to both the radar and the beacon frequency.

Upon interception by the antenna 3 of a reflected or radar signal, the wave energy of the signal proceeds along the wave guide toward the transmitter 1. Since the T-R switch T-R1 is not resonant to the radar frequency, it presents a low impedance to the radar frequency, which is transformed by the half wave length wave guide channel 4 into a low impedance across the T junction T1. Radar energy accordingly passes by the junction T1 and proceeds to junction T2. At the junction T2 is presented an open circuit to the radar frequency, since the T-R switch T-R2 is highly resonant at the radar frequency. Energy is accordingly enabled to pass down the channel 5, through the T-R switch T-R2 and on to the crystal mixer 7 via the wave guide section 8. The anti-T-R switch ATR is resonant to the reflected signal, but is relatively frequency insensitive. Since the distance between junctions T3 and T2 is approximately $$\frac{\lambda}{4}$$

the anti-T-R switch presents a short circuit across the main wave guide 2 at the junction T2. The reflected radar energy is thus presented with a single possible path of flow, i. e. via channels 5 and 8.

A junction T4 is formed in the wave guide channel 8, for coupling between the latter and the output end of the T-R switch T-R1, over a wave guide section 9. The wave guide section 9 is arranged to be an integral number of half wave lengths long, so that the T-R switch T-R1 presents a short circuit to the radar frequency at the junction T4, and energy at radar frequency is not diverted from the wave guide section 8 by the wave guide section 9.

The crystal mixer 7 is coupled in known fashion to an intermediate frequency amplifier 10, the output of which is detected in a detector 11 and then applied to a suitable radar indicator 12 for display of range information.

Reception of a beacon signal and transmission of the beacon signal energy down the wave guide 2 encounters phenomena generally similar to those above described. The anti-T-R switch ATR, since it presents a high impedance to the beacon frequency at T2, presents a low impedance across the main wave guide 2 at the junction T2 to the left of this junction. The T-R switch TR2 likewise presents a low impedance across the wave guide 5 at the junction T2. Therefore, the impedance at the junction T2 both across wave guide 2 on the left and across wave guide 5 is low and the impedance across wave guide 2 at T2 on the right is low. Therefore the impedance across wave guide 2 at the left of T1 is also low. Since TR-1 is tuned to the beacon frequency it presents a high impedance across wave guide 4 at T1 and the received energy flows down wave guide 4. Accordingly, all energy at the beacon frequency is directed into channel 4, passes through the resonant T-R switch TR-1, and through the channel 9 to the junction T4. The switch TR-2 presents a low impedance to the junction T4, preventing passage of energy toward the switch TR-2. Energy is accordingly routed to the crystal mixer 7, and is converted, amplified and ultimately displayed on the range indicator 12.

Local oscillations are supplied to the crystal mixer 7 from a pair of sources 13, 14 of suitable frequency. The local oscillator 13 supplies energy at a frequency suitable for heterodyning with the radar signal, converting the latter to the desired I. F. frequency. The local oscillator 14, on the other hand, supplies energy at a frequency suitable for heterodyning with the beacon signal, converting the latter to an identical I. F. frequency. The local oscillators 13 and 14 are coupled in series with the crystal mixer 7 over a wave guide 15, the local oscillators 13 and 14 being separated by a section of the wave guide section 15 having a length of an integral number of half-wave lengths, and the length of the guide 15 between either of the oscillators 13 and 14 and the crystal mixer 7 is likewise an integral number of half wave lengths long, to provide optimum coupling with the crystal mixer 7.

The wave guide 15 may be terminated in a suitable tuning plunger 16, which may be adjustable within the guide to maximize the transfer of energy between the local oscillators 13 and 14, and the crystal mixer 7, in known fashion.

The system as hereinabove described in detail and illustrated in the accompanying drawing has been shown to be capable of efficient and effective reception of radar and beacon signals, at respectively different frequencies, and without mutual interference, in a single antenna radar system utilizing highly selective T-R switches. It remains to show that the system as described and illustrated is capable of reducing the amplitude at the crystal mixer of transmitted pulses energy which has leaked by the T-R switching system, by virtue of interference of such pulses arriving at the crystal over different paths. For this purpose it is necessary merely to show that the paths for transmission of leakage energy from junction T2 to junction T4 via wave guide section 5, 8 and via wave guide section 2, 4, 9 differ by an odd number of half wave lengths. The junctions T2 and T4 are separated by one full wave length, or an even number of half wave lengths, when measured along the guide sections 5, 8. When measured along the guide sections 2, 4, 9, the separation in half wave lengths is $$\frac{n\lambda}{2}+\frac{n\lambda}{2}+\frac{\lambda}{2}=n\lambda+\frac{\lambda}{2}$$

when $n$ is any integral number. It will be clear by inspection that $$n\lambda+\frac{\lambda}{2}$$

involves an odd number of half wave lengths, regardless of the value of $n$.

Since the transmitted energy which leaks past the T-R switches TR-1 and TR-2 arrives at the junction T4 over paths differing by ½λ, the energy must arrive, over the two paths, in opposite phase. Hence, at least for the flats of the transmitted pulses, during which relatively steady state conditions hold, cancellation is effected.

It will be realized that modifications of the exemplary and specific arrangement herein disclosed may be resorted to without departing from the true scope of the invention. In particular the electrical distance from the T-R switches TR-1 and TR-2 to the junctions T1 and T2 may be any number of half wave lengths, including zero, and these distances need not be equal in both cases. Likewise, the electrical distance from T-R switch TR-1 to junction T4 need not equal the electrical distance between junctions T1 and T2 and the electrical distance between switch TR-2 and junction T4 need not be $$\frac{\lambda}{2}$$

but may be any integral number of half wave lengths.

If cancellation of wave energy at the crystal mixer 7 is to be accomplished, it is essential that the electrical length from any point in the guide 2, and specifically from the transmitter 1, differ, via the path including switch TR-1, and via the path including switch TR-2, by an odd number of half wave lengths of the operating frequency. Otherwise, however, this is immaterial.

It will further be clear that the nature of the junctions T1 and T2 will determine the locations of the T-R switches TR-1 and TR-2, and in particular that the switches may be located directly at the junctions T1 and T2, if desired. The latter arrangement is not usually recommended or preferred, however. Similarly, various types of compound T-R switches may be utilized.

In accordance with the specific aspects of our invention the transmission system involving the branch guides 4 and 5 include T-R switches. Other devices than switches, for example, filters, may be included in accordance with the broader aspects of our invention.

The invention is obviously applicable to radar systems wherein co-axial or parallel wire lines are substituted for wave guide, as a means for transmission of electro-magnetic energy.

We are aware that still further modifications in detail, and many re-arrangements, of the specific embodiment of our invention herein described and illustrated, may be resorted to without departing from the true spirit and scope of our invention.

We claim as our invention:

1. In combination, a radar transmitter, a radar receiver, a single antenna coupled with said radar transmitter and with said radar receiver for transmitting at any instant signals of substantially a single frequency provided by said radar transmitter and for receiving about said instant signals from remote objects, said received signals being of a first frequency derived by reflection from remote objects of said transmitter frequency and of a second frequency emitted from a remote object in response to said transmitter frequency, and an energy transmission channel for coupling said antenna and said radar transmitter, and a pair of received energy transmission channels extending from said first mentioned energy transmission channel to said radar receiver, said channels being selectively responsive to said first and second frequencies, said pair of received energy transmission channels being separated along said first mentioned energy transmission channel by an integral number of half wave lengths of oscillations of said first frequency.

2. A radio frequency switching system including a main transmission means for connection between a transmitter and an antenna system, a first transmission line connected to a first point intermediate the ends of said main transmission means for connection to a receiver, a second transmission line connected to a second point intermediate the ends of said first transmission means for connection to said receiver, a first transmit-receive switch sharply tuned to a first frequency located in said first transmission line, and a second transmit-receive switch tuned to a second frequency located in said second transmission line.

3. The combination in accordance with claim 2 wherein said first and second transmission lines are separated along said main transmission means by a distance substantially equivalent to an integral number of half wave lengths of said transmitter frequency.

4. The combination in accordance with claim 2 wherein each of said transmit-receive switches is located along its associated transmission line at a distance adapted to translate an impedance condition of each transmit-switch into a substantially identical impedance condition at said main transmission means.

5. The combination in accordance with claim 2 wherein said first and second points are separated by an electrical length equal to substantially an integral number of half wave lengths of said transmitter frequency.

6. The combination in accordance with claim 2 wherein said first transmit-receive switch is located $$\frac{n_1 \lambda}{2}$$

wavelengths from said first point, wherein said second transmit-receive switch is located $$\frac{n_2 \lambda}{2}$$

wavelengths from said second point, and wherein said first and second points are separated from each other by $$\frac{n_3 \lambda}{2}$$

wavelengths, $n_1$, $n_2$, $n_3$, being each any integral number and $\lambda$ being substantially the wavelength of said transmitter.

7. The combination in accordance with claim 2 wherein said first transmit-receive switch is located $$\frac{n_1 \lambda}{2}$$

wavelengths from said first point, wherein said second transmit-receive switch is located $$\frac{n_2 \lambda}{2}$$

wavelengths from said second point, wherein said first and second points are separated from each other by $$\frac{n_3 \lambda}{2}$$

wavelengths, and wherein the total electrical distance between any point on said main transmission means and said receiver via said first and second transmission lines differ by $$\frac{n_4 \lambda}{2}$$

where $n_1$, $n_2$, $n_3$ are any integral numbers, where $n_4$ is any integral odd number, and where $\lambda$ is substantially the wave length of said transmitter frequency.

8. A switching circuit adapted to be connected between an antenna and a transmitter comprising a transmission conduit coupling said transmitter and said antenna, a first receiver conduit capable of transmitting currents of a first frequency, a second receiver conduit capable of transmitting signals of a second frequency, means coupling said receiver conduits to said transmission conduit, a first amplitude responsive electronic switch responsive to transduce only received signals of said first frequency connected in series with said first receiver conduit, a second amplitude responsive electronic switch responsive to transduce only received signals of said second frequency connected in series with said second receiver conduit, a common output terminal for said first and said second receiver conduits, the electrical lengths of said conduits being of such wavelength as to prevent transfer of energy from either of said conduits to the other conduit.

EUGENE F. GRANT.
LEON KATZ.

References Cited in the file of this patent

UNITED STATES PATENTS

| Number | Name | Date |
|---|---|---|
| 2,129,669 | Bowen | Sept. 13, 1938 |
| 2,445,213 | Evans | July 13, 1948 |
| 2,448,623 | Rose | Sept. 7, 1948 |
| 2,471,373 | Joyner | May 24, 1949 |
| 2,541,982 | Bernstein | Feb. 20, 1951 |
| 2,593,120 | Dicke | Apr. 15, 1952 |

OTHER REFERENCES

Proc. of the IRE "Naval Airborne Radar," vol. 34, No. 9. September, 1946 (pages 678 to 680). (Copy in Div. 51.)

"Principles of Radar," 2nd edition, by the M. I. T. Radar School Staff. Pub. by McGraw-Hill Book Co. Copy in Patent Office Library, received May 9, 1947. Copyright 1946 (use pages 10-43 and 10-44).